May 13, 1969　　　J. R. DOHERTY　　　3,443,291
DRILL COLLAR SAFETY SLIP
Filed Sept. 25, 1967
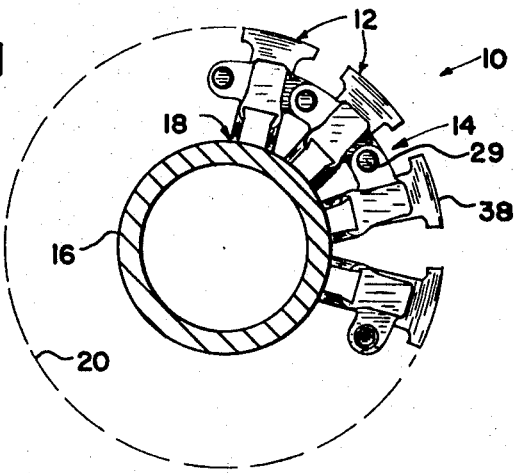
FIG. 1
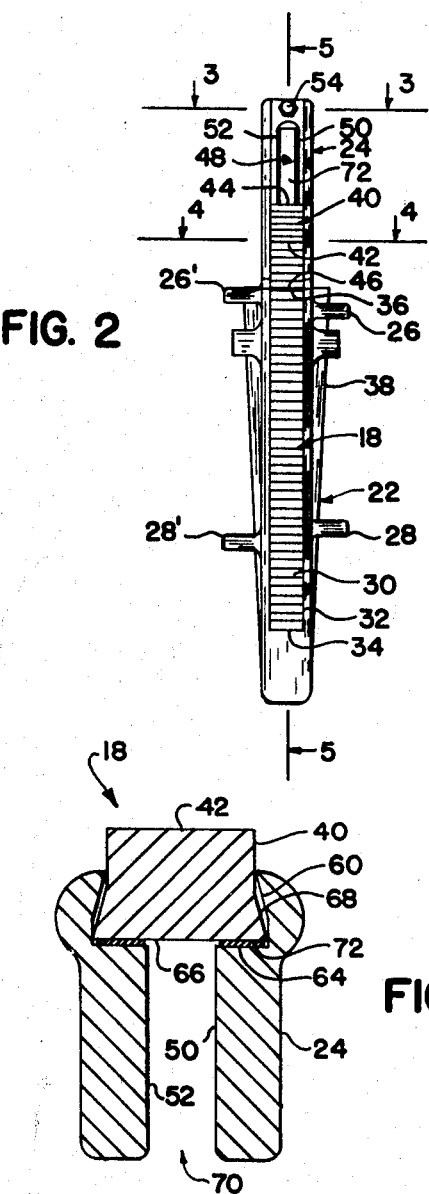
FIG. 2
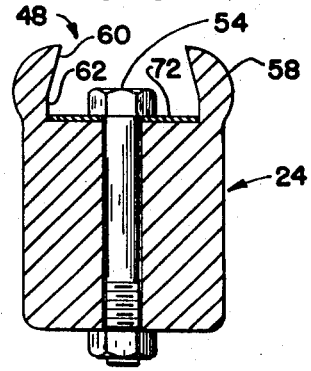
FIG. 3
FIG. 4
INVENTOR.
JACK R. DOHERTY
BY
MARCUS L. BATES May 13, 1969  J. R. DOHERTY  3,443,291
DRILL COLLAR SAFETY SLIP Filed Sept. 25, 1967

INVENTOR.
JACK R. DOHERTY
BY
MARCUS L. BATES

United States Patent Office 3,443,291
Patented May 13, 1969

3,443,291
DRILL COLLAR SAFETY SLIP
Jack R. Doherty, P.O. Box 1871,
Odessa, Tex. 79760
Continuation-in-part of application Ser. No. 524,114,
Feb. 1, 1966. This application Sept. 25, 1967, Ser.
No. 670,065
Int. Cl. E21b 7/00
U.S. Cl. 24—263        7 Claims

ABSTRACT OF THE DISCLOSURE

A set of slips made up of a series of segments, each being hinged together so as to enable the segments to cooperate together in a manner where they may be opened sufficiently to be placed between a pipe and a bowl at the top of a well casing or the like. Each segment consists of a main body having a liner fastened to the pipe engaging side thereof, with the liner having a friction face located thereon which engages the pipe when placed in operative relationship therewith. A slidable wedge is received within a channel at the top of each segment which permits limited vertical movement of the wedge. A friction face on the wedge is adapted to move into a pipe engaging position as the pipe contacts the liner. The liner and wedges of the slips operatively engage the pipe in a manner whereby slippage of the pipe relative to the liner will cause the wedge to move downwardly thereby further increasing the friction exerted between the liner and the pipe as the wedge digs into the pipe surface.

*Cross reference to related application*

This application is a continuation in part of Ser. No. 524,114, filed Feb. 1, 1966, entitled, "Drill Collar Safety Slip."

*Background of the invention*

This invention relates to the art of bore hole operations including well drilling, and more particularly for use with that type of apparatus which is provided with a tapered means, such as found in a rotary table or may be placed on top a casing, and through which extends a drill string consisting of the drill and the drill stem, with sections of the tubing interposed therebetween. The tapered means, or bowl, is conventional and is adapted to receive a set of pipe lips therein to hold the drill stem fixed in place relative to the casing or table.

As pointed out in my co-pending patent application, now Patent No. 3,349,455, issued Oct. 31, 1967 as a well is drilled to increasing depths, it is necessary to remove the drill pipe by breaking up the drill string into successive pipe sections so as to replace the drill bit at the lower extremity thereof. The last several hundred feet of the drill stem is comprised of drill collars which are constant in diameter and provide no projections by which a positive acting clamp or the like may be used to secure the drill stem while making up or breaking down the drill string. During this operation it has become customary to employ a set of slips to hold the drill and string of collars at some particular point of elevation while the additional sections are being connected. When a sub or an additional drill collar is being placed on the string, the string may be inadvertently jarred, whereupon the string will slide through the liner of the slips and accordingly will be lost in the well. This is especially so when the liners have become unduly worn so as to provide an insufficient amount of friction between the liner face and the drill collars. In the case where the drill collars are being made up, only a few feet of travel is required before the drill stem is lost in the bore hole. Where the sub has been added on to the drill string and the entire string slips, the string may travel several feet before the slips again take hold or set, thereby attempting to stop the movement of the traveling pipe. By this time the momentum of the heavy string of pipe has become so great that the slips cannot stop the movement, or if the slips do set, they will fail and the pipe accordingly is dropped to the bottom of the well. If the slips do catch and stop the movement of the pipe, the drill stem will usually part below the turntable thereby dropping the remaining string into the bore hole.

Hereinafter, such apparatus as well casing, tubing, rods, drill pipe and the like will be referred to as "pipe" with the understanding that such term is sufficiently comprehensive to include any form of object with which the invention may be associated.

*Summary*

This invention provides an improved drill collar safety slip fabricated from a multiplicity of hinged segments. Each segment includes a main body adapted to be received by a bowl, and a friction face in the form of a removable liner is affixed to the pipe engaging side of the main body of each segment. The upper extremity of each segment includes a channel which receives a vertically movable wedge having a friction face thereon to thereby provide an auxiliary slip setting device. The channel which receives the wedge is set at an angle with respect to the pipe whereby downward movement of the wedge causes the friction face thereof to progressively move into tighter engagement with the pipe. The drill pipe will normally be secured relative to the slips and the bowl by the friction face of the liner. However, should the pipe slip with respect to the liner, the auxiliary slip setting device, or wedge, will be forced into tighter engagement with the pipe to thereby force the slip segments into tighter engagement against the pipe.

Accordingly, the primary purpose of my invention is to provide an auxiliary gripping device associated with a set of slips which reacts rapidly upon movement of the pipe to set the slips around the moving pipe before it has had a chance to gain sufficient momentum to do any serious damage.

Another object of this invention is to provide a gripping device having an auxiliary wedge means thereon that automatically sets the slips into greater gripping relationship to the string of pipe upon initial movement of the pipe string.

A further object of this invention is to provide a set of slips comprised of a novel gripping device which has dual engaging members, with the engaging surfaces of the members being arranged so that one of the engaging members acts in a fashion so as to multiply the force exerted by the second engaging member upon movement of the pipe.

A still further object of this invention is to provide a gripping device which will hold a string of pipe so that additional sections of pipe may be added or removed as well as to prevent the string of pipe from slipping and falling into a bore hole.

A still further important object of this invention is to provide a pipe holder of such special construction that when it is seated in the taper of a rotary table, or other type supporting means, it will securely grip and hold the suspended pipe string so as to allow additional joints of pipe to be added or removed therefrom, and additionally includes an auxiliary wedge device that will cause the main pipe holder to increase the force of its grip upon the string of pipe should slippage occur.

Another additional object of this invention is to provide a novel segmented set of slips having arranged on a face thereof a vertically slidable wedge means having a friction face thereon which engages the outer peripheral surface of a pipe in a manner to increase the friction normally exerted by a set of slips should the pipe inadvertently slip with respect to the main slip segments.

Other objects and advantages will appear from the following specification when studied in conjunction with the accompanying drawings.

*Brief description of the drawings*

FIGURE 1 is a top plan view of the invention which shows the relationship of the safety slip with respect to a pipe;

FIGURE 2 is a side elevational view of a single segment of the invention, as viewed from the pipe side thereof;

FIGURE 3 is a cross-sectional view taken along line 3—3 of FIGURE 2;

FIGURE 4 is a cross-sectional view taken along line 4—4 of FIGURE 2;

*Description of the preferred embodiments*

Figure 5:
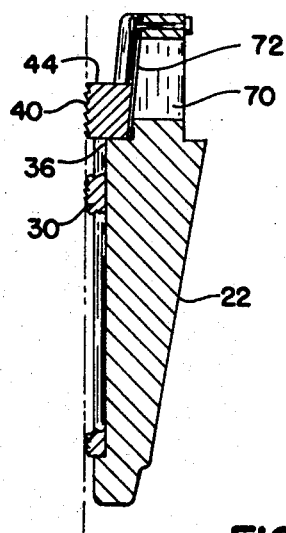
FIGURE 5 is a longitudinal cross-sectional view taken along line 5—5 of FIGURE 2.

Looking now to the details of the various figures seen in the drawings, there is disclosed a set of drill collar safety slips, hereinafter referred to as a "set of slips," or "a pipe holder," generally illustrated by the arrow at numeral 10. The pipe holder is comprised of a multicplicity of individual segments 12 hinged together as seen at 14 so as to encompass a pipe 16 therewithin. The arrow at numeral 18 illustrates the pipe engaging side of the segments.

The segments are hinged together along the dashed line 20 and is one hinge short of forming a completely enclosed circle. Accordingly, the pipe holder may be forced open at this unhinged portion so as to increase the gap at the missing hinged joint to thereby enable the pipe holder to be easily spread apart and placed adjacent the pipe whereupon it is then pulled about the outer periphery of the pipe and dropped into position in a conventional bowl located at the top of a casing or into the conventional tapered housing at the top of the rotary table.

Each individual slip segment 12 is preferably molded or cast as a unitary body having a lower portion 22 and an upper portion 24. Upper and lower apertured lugs 26, 26' and 28, 28' respectively, are arranged whereby adjacent lugs on either side may be interlocked with the lugs of an adjacent segment and a pin 29 vertically inserted into the apertures of adjacent sets of lugs to thereby form the before mentioned hinge 14.

The liner 30 is removably received by the lower body portion 22 and includes two spaced apart vertical edge portions, one of which is seen at 32, a lower terminal end 34, and an upper terminal end 36, with the face 18 of the liner being provided with serrations or teeth which contact the pipe in high friction relationship thereto. Numeral 38 indicates the bowl engaging side of the segment.

An auxiliary slip setting device in the form of a slidable wedge 40 is provided with serrations or teeth on the pipe engaging side 42 thereof, and includes an upper terminal end 44 and a lower terminal end 46. The wedge is slidably received within a U-shaped channel as generally illustrated by the numeral 48. Behind the channel is a slot 70 formed by the illustrated vertical sidewalls 50 and 52. The U-shaped channel extends from the vicinity of the upper terminal end 36 of the liner to the top of the segment while the slot terminates in a bridge which receives a bolt 54 therethrough. The bolt therefore forms a stop means which prevents the wedge from sliding vertically upward and out of the segment.

The before mentioned U-shaped channel is defined by spaced apart legs 58 which are formed by milling the illustrated side walls 60, 62, and 64 into the upper portion of the segment. The channel receives the dovetailed sidewalls 68 of the wedge therewithin, with the rear face 66 of the wedge bearing against wall 64 of the channel. A spring 72 in the form of an inverted U is suitably disposed between the wedge and channel with each leg of the U being received between wall 64 of the channel and face 66 of the wedge. The base of the U is rigidly fastened to the inside wall of the channel by means of bolt 54 in a manner as best seen in FIGURES 3 and 5.

Figure 6:
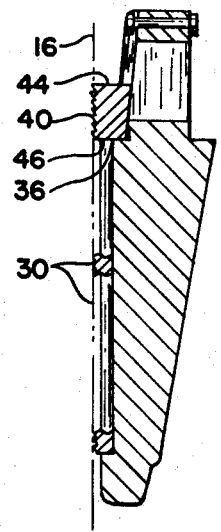
FIGURE 6 is a modification of the device seen in FIGURES 1–5A.
Figure 6A:
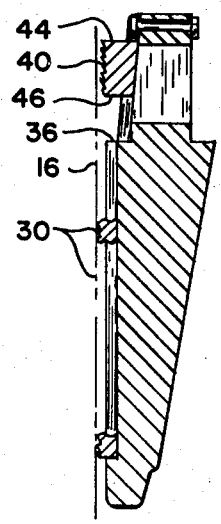
FIGURE 6A is similar to FIGURE 6, but with part of the device being shown in a different operative position.

Looking now to the details of FIGURES 6 and 6A, there is seen illustrated a modification of the device shown in the foregoing figures wherein the spring 72 is eliminated from the device, whereupon the wedge 40 freely reciprocates within the U-shaped channel and is biased in a downward position only by the force of gravity.

Figure 7:
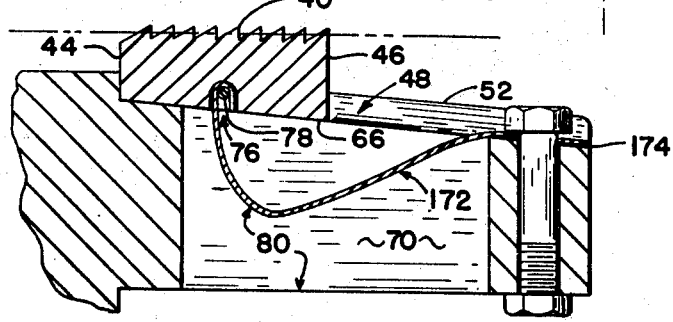
FIGURE 7 is a fragmentary cross-sectional view showing still a further modification of the device seen in the foregoing figures.

Looking now to the details of FIGURE 7, there is seen a modified form of the before mentioned wedge 40 which has a spring 172 attached to the top of the segment at 174 and the opposite free end thereof is bent back upon itself and is received within the cavity 76 where it is maintained attached to the wedge by means of a pin 78. The spring moves within the slot 70 as the wedge 40 reciprocates within its U-shaped channel. Numeral 80 illustrates the area in which the spring moves as it is flexed by the reciprocating action of the wedge.

*Operation*

The set of slips are assembled by first slidably forcing the dovetailed liner through the U-shaped channel until edge portion 34 abuts the bottom of the channel. The liner is rigidly pinned into place leaving a channel which reciprocatingly receives the wedge. The channel is defined by legs 58, with the bottom now being defined by upper edge portion 36 of the liner. The wedge channel is slightly sloped as seen in FIGURES 5 and 6.

Wedge 40 is slidably received by its respective channel and normally rests in the illustrated position of FIGURES 2, 5, 6, or 7 when the slip is not in use.

Bolt 54 is next installed through the aperture provided at the upper extremity of the upper body portion. The spring 72, when used in conjunction with the wedge, must be fitted into position prior to installation of bolt 54. The modification of FIGURE 7 requires the additional step of securing the lower terminal end of the spring 172 within the cavity 76. This is best accomplished prior to sliding the wedge into the channel.

The wedge is now free to reciprocate between the limits provided by upper edge 36 of the liner and the bolt 54. Each segment is next hinged together by installing the vertically depending pin 29 through the apertured ears of adjacent lugs. The pin is provided with a fastener at the lower terminal end thereof to prevent inadvertent disassembly thereof.

In making up a string of pipe or tubing, the pipe holder is engaged around the upper end of the string which is suspended in the bore, and when an additional joint of pipe is screwed onto the upper end of the string, the thus completed string is elevated thereby freeing the teeth of the liner from the pipe and clearing the slips from its wedging action. A workman may then grip a set of handles provided on the slips (not shown) and pull the assembly upwardly and outwardly clear of the pipe and bowl and rest the slips in a vertically standing position on the rotary of the drilling rig. The entire string is then lowered until its upper end is again opposite the bowl or the taper in the turntable, whereupon the set of slips are again lifted into place between the pipe and the bowl where it will, of its own accord, seat into place and rigidly grip the pipe as the elevator is lowered. These steps are repeated until the entire string of pipe is completely assembled.

In breaking up a string of pipe, the upper joint to be unscrewed extends above the rotary table with the pipe holder maintaining the next lower adjacent joint rigidly affixed to the bowl or the taper in the rotary table. When the joint is unscrewed and removed, the string is again elevated, thus releasing the slips, whereupon the slips can be set aside until the top of the next joint of pipe is raised. The slips are reset in the bowl of the rotary table to again support the string of pipe. This procedure is repeated until the entire spring is broken up.

As will now be evident to those skilled in the art, the instant novel set of slips is wedged between the pipe and the bowl of the drilling rig with the pipe riding against the teeth of the friction face 18 of each segment and carrying the outside lower portion 38 against the bowl with a force that is proportional to the weight of the string of pipe. The friction face 42 of the wedge always rests against the pipe while the friction face 18 of the liner rigidly grip the pipe. Should the pipe slip, due to a greasy or perhaps extremely smooth exterior, or because the teeth 18 have become unduly worn, the teeth of friction face 42 of the wedge will follow the pipe in a downward direction thereby forcing the wedge to travel in an outwardly and downwardly direction in the channel. This action exerts an increasing pressure on the pipe which is in proportion to the weight of the string of pipe. As the wedge continues to engage the pipe, the slips will be forced downwardly and into tighter engagement against the string of pipe until the necessary force required to stop the slippage is exerted by the pipe holder. Since the friction face 42 of the wedge always rides against the exterior of the pipe, an extremely small slippage will set the wedge-like action into motion to thereby immediately arrest the pipe movement. Under ordinary circumstances, however, the wedge will carry no load.

It should be noted that the wedge, upon engagement with the string of pipe provides an additional downwardly directed force. This force causes the sloped portion of the segment at 38 to be driven further along the bowl taper and hence forces the liner into tighter engagement with the pipe. This action causes the wedge to exert an outwardly directed force against the upper body portion of the segment which has a tendency to pivot the entire segment about an area located at the upper extremity of the liner, whereupon the lower portion of the slip will then tend to pivot, forcing the liner to be driven into tighter engagement with the pipe.

In the event where a tool string has slipped (due to the inability of the friction face 18 to maintain the string of pipe held in its relative position), the tool is removed in the before mentioned conventional fashion, merely by lifting the pipe a small amount so as to remove the weight from both the wedge and the slips. Normally, when a string of pipe moves or slips and sets the wedge, it will be evident that the liners are dull and need replacement.

Figure 5A:
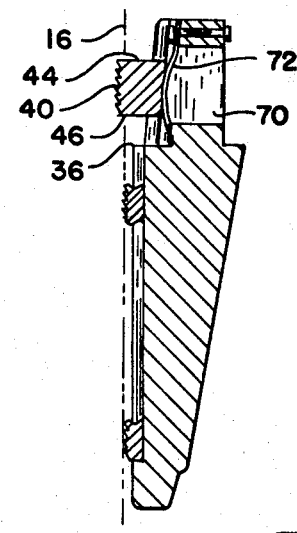
FIGURE 5A is similar to FIGURE 5, with a portion of the device being shown in a different position.

When the slips are dropped into place between the drill stem and the bowl, the liners become aligned with the drill stem and at the same time the wedges ride from the position of FIGURES 5, 6, or 7 to that of FIGURES 5A or 6A where the wedges are held against the drill collar. Either the spring or gravity forces the wedges to remain in a dormant or standby position until they are needed. At anytime after the slips are operatively in place that the drill stem should for some reason start to move with respect to the wedges, the wedges (now in the position of FIGURES 5A or 6A) will cause the slips to arrest such movement. Hence the wedges merely lay against the drill collar and, in the event the drill collar starts moving due to slippage through the slips, the wedge will be carried along with the pipe, thereby forcing the wedge to travel downwardly and outwardly into tighter engagement with the drill collar, thereby arresting any further movement of the drill stem by the joint action of the wedge and liner.

An added advantage of the present invention over the prior art is found in the cooperation between the liner and the main body construction which permits the liner to be replaced without disassembly of the entire set of slips. This is accomplished by removing the wedge, removing the liner fastening means, pressing the old liner from its channel, and pressing the new liner into the channel. This may be accomplished without removing the hinge pins 29. After securing the new liner in place, the wedge is replaced in the before described manner.

It should be noted that this invention is particularly useful and may be built into any slip that is used in conjunction with drill pipe, drill collars, tubing, flush joints, and the like. Furthermore, the main body of the slip preferably is cast as an integral part from 4130 steel, and the wedges, including the serrated surface, are preferably cast from 8620 steel, although the main body may alternatively be cast from various light weight alloys, including the magnesium alloys.

What I claim and desire to secure by Letters Patent is:

1. A pipe holder or set of slips made up of a series of segments hinged together and adapted to be placed between a pipe and a bowl at the top of a well casing or the like;
   each segment having a main body, said main body having a pipe engaging side and a bowl engaging side, a liner fastened to the pipe engaging side of said main body;
   said liner having a friction face thereon for engaging the pipe when placed in operative relationship thereto;
   a wedge overlying and spaced apart from said liner, means slidably mounting said wedge to said main body of the segment, and said wedge having a friction face thereon and adapted to be moved into a pipe engaging position, whereby:
   when said pipe holder is operatively engaging the pipe, slippage of the pipe relative to said liner will cause said wedge to engage the outer peripheral surface of the pipe to thereby increase the friction exerted by the linear against the pipe.

2. The improvement of claim 1 wherein said means slidably mounting said wedge to said main body includes a U-shaped channel;
   said wedge having means forming a dovetail configuration opposite said friction face, said dovetail configuration adapted to be slidably received by said U-shaped channel, whereby:
   said wedge can be reciprocated within said channel from a pipe engaging to a retracted position with respect to said pipe.

3. The improvement of claim 2 wherein said channel is downwardly and outwardly sloped with respect to the pipe engaging side of said segment.

4. The improvement of claim 2 wherein said U-shaped channel extends longitudinally along the major length of the pipe engaging side of the segment;
   said liner being removably affixed within the lower portion of said channel;
   said wedge being slidably and reciprocatingly received within the upper portion of said channel.

5. The improvement of claim 1 wherein said means slidably mounting said wedge is sloped in a downward and outward direction with respect to the friction face of the liner to thereby permit movement of said wedge from a lowermost position to an uppermost position;
   said friction face of said wedge extending beyond said friction face of the liner and toward the pipe engaging side of the segment when the wedge is in the lowermost position, and said friction face of said wedge being retracted away from the pipe engaging side of the liner when the wedge is in the uppermost position.

6. The improvement of claim 1, and further including spring biasing means which maintains said wedge biased towards the pipe engaging side of the segments.

7. The improvement of claim 1, and further including means biasing said wedge in a downward and outward direction with respect to the pipe engaging side of the segments.

References Cited

UNITED STATES PATENTS

| | | | |
|---|---|---|---|
| 634,216 | 10/1899 | Robinson | 81—186 XR |
| 1,556,094 | 10/1925 | Fletcher | 24—263.5 |
| 2,563,851 | 8/1951 | Lundeen et al. | 24—263.5 |
| 2,722,450 | 11/1955 | Nelson | 294—90 XR |
| 2,890,513 | 6/1959 | Lane | 24—263.5 |
| 2,924,866 | 2/1960 | Johnson | 24—249 |

DONALD A. GRIFFIN, *Primary Examiner.*